US006310656B1

United States Patent
Miyazaki et al.

(10) Patent No.: US 6,310,656 B1
(45) Date of Patent: Oct. 30, 2001

(54) TELEVISION APPARATUS, DISPLAY METHOD OF TELEVISION APPARATUS AND PICTURE PLANE CONTROL APPARATUS, AND METHOD

(75) Inventors: Shinichiro Miyazaki; Yoshinobu Tsunetomi; Akira Shirahama, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/353,234

(22) Filed: Jul. 14, 1999

Related U.S. Application Data

(63) Continuation of application No. PCT/JP98/05140, filed on Nov. 16, 1998.

(30) Foreign Application Priority Data

Nov. 17, 1997 (JP) .................................................. 9-315106

(51) Int. Cl.[7] .................................................. H04N 5/45
(52) U.S. Cl. ........................ 348/568; 348/565; 348/581
(58) Field of Search ................................... 348/565, 566, 348/567, 564, 563, 584, 588, 568, 581; 358/183, 22 PIP; 345/113, 115, 127; H04N 5/450, 5/262, 5/445, 5/44

(56) References Cited

U.S. PATENT DOCUMENTS 5,963,221 * 10/1999 Shimizu et al. ...................... 348/565

FOREIGN PATENT DOCUMENTS

0258803 * 3/1988 (EP) ............................... H04N/5/450

* cited by examiner

*Primary Examiner*—David E. Harvey
(74) *Attorney, Agent, or Firm*—Frommer Lawrence & Haug LLP.; William S. Frommer; Joe H. Shallenburger

(57) ABSTRACT

In a divider, a ratio of a magnification or a reduction of an image is set from a writing range and a reading range. In a horizontal interpolating circuit and a vertical interpolating circuit, an interpolation is performed on the basis of the magnification ratio. In the horizontal interpolating circuit and the vertical interpolating circuit, an interpolation is performed on the basis of the reduction ratio. In a field memory, a portion of the image of an arbitrary size at an arbitrary position is written on the basis of a control signal which is supplied from a write memory control circuit. The image is read out from the memory on the basis of a control signal which is supplied from a read memory control circuit.

19 Claims, 8 Drawing Sheets

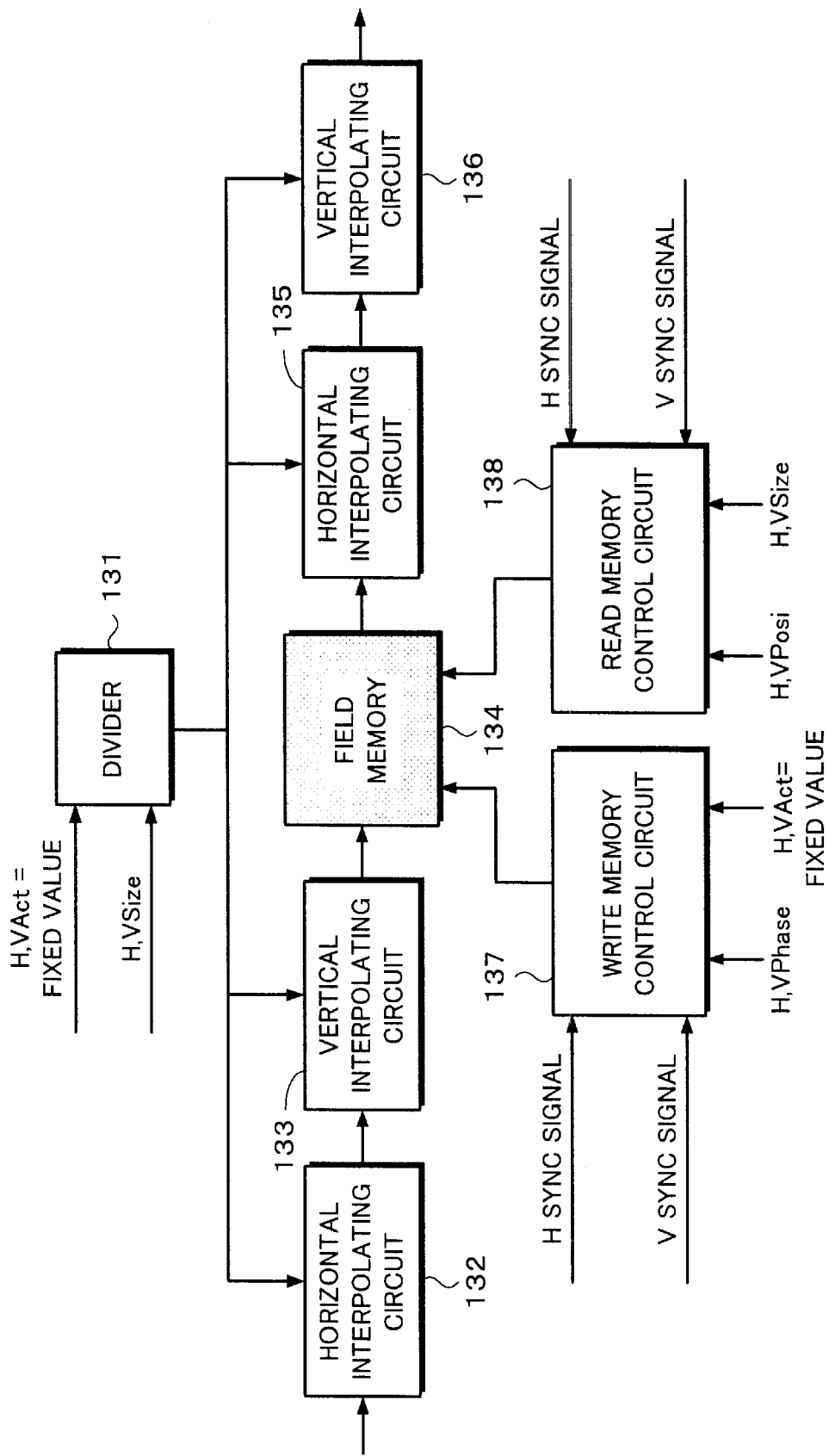

TELEVISION APPARATUS, DISPLAY METHOD OF TELEVISION APPARATUS AND PICTURE PLANE CONTROL APPARATUS, AND METHOD

This is a continuation of copending International Application PCT/JP98/05140 having an international filing date of Nov. 16, 1998.

TECHNICAL FIELD

The invention relates to a television apparatus for displaying picture-in-picture or picture-and-picture in which a first picture plane and a second picture plane can be displayed, a display method of such a television apparatus, and picture plane control apparatus and method.

BACKGROUND ART

FIG. 8 shows a block diagram for performing what is called a picture-in-picture (hereinafter, referred to as a PinP) in which a slave picture plane is displayed in a conventional master picture plane. In the block diagram shown in FIG. 8, a scaling and a display position of the slave picture plane are set through a field memory 134. Parameters of a writing range (HAct, VAct) and a reading range (HSize, VSize) are supplied to a divider 131. The writing range (HAct, VAct) is a fixed value. In the divider 131, a ratio of magnification or reduction is set. In a horizontal interpolating circuit 132 and a vertical interpolating circuit 133, when the reduction ratio is supplied from the divider 131, an interpolation in the horizontal and vertical directions is performed to an image inputted on the basis of the ratio.

The image supplied from the vertical interpolating circuit 133 is written into the field memory 134 on the basis of a control signal which is supplied from a write memory control circuit 137. A horizontal sync signal, a vertical sync signal, and parameters of a write start position (HPhase, VPhase) and the writing range (HAct, VAct) of a fixed value are supplied to the write memory control circuit 137. Those parameters have a relation shown in FIG. 9. An image surrounded by the writing range (HAct, VAct) of the fixed value is written into the field memory 134.

The written image is read out from the field memory 134 on the basis of a control signal which is supplied from a read memory control circuit 138. The horizontal sync signal, the vertical sync signal, and parameters of a read start position (HPosition, VPosition) and the reading range (HSize, VSize) are supplied to the read memory control circuit 138. Those parameters have a relation shown in FIG. 10. The image written in the field memory 134 is read out so as to be displayed in a range surrounded by the reading range (HSize, VSize).

In a horizontal interpolating circuit 135 and a vertical interpolating circuit 136, when the magnification ratio is supplied from the divider 131, an interpolation in the horizontal and vertical directions is performed to an image supplied on the basis of such a ratio.

It is a feature of PinP that the writing range (HAct, VAct) which is set to the field memory 134 is set to a fixed value on the assumption that the operation to magnify or reduce the whole picture plane is performed. A display picture plane size is determined by only the setting of the reading range (HSize, VSize). FIGS. 9 and 10 show relations between the parameters for the write memory control circuit 137, read memory control circuit 138, and divider 131 and the horizontal and vertical sync signals. As shown in FIG. 9, upon writing, only the write start position (HPhase, VPhase) becomes the parameter. Upon reading shown in FIG. 10, the position and size are set by the parameters of the read start position (HPosition, VPosition) and the reading range (HSize, VSize). An actual display picture plane of PinP is shown in FIG. 11. As shown in FIG. 11, in the conventional PinP, a slave picture plane 142 obtained by reducing an almost whole picture plane of a program on a different channel is displayed in the master picture plane 141.

However, in case of PinP, since almost whole picture plane is reduced and displayed as a slave picture plane, there is a problem such that small characters cannot be discriminated or a small person cannot be recognized. For example, when a relay of a baseball game or a soccer game is displayed on the slave picture plane, a problem such that the score cannot be discriminated occurs.

Further, in case of what is called a picture-and-picture (hereinafter, referred to as a P&P) in which a picture plane 146 is displayed adjacently to a picture plane 145 shown in FIG. 12, when a letter box signal is displayed, there is a problem such that upper and lower black edges are displayed in a frame of the picture plane 146. This is a problem such that the frame which does not correspond to the inherent aspect ratio is displayed in the picture plane.

It is, therefore, an object of the invention to provide a television apparatus in which in a display of PinP or P&P, the portion of an image of an arbitrary size at an arbitrary position in an image of a program on a different channel or an image of another input signal is displayed in the second picture plane, a display method of such a television apparatus, and picture plane control apparatus and method.

DISCLOSURE OF INVENTION

According to the invention, there is provided a television apparatus for displaying a first picture plane and a second picture plane onto a same picture plane, characterized in that the apparatus has signal processing means for magnifying or reducing an input signal of a program on a different channel or an input signal other than a signal displayed at present on the first picture plane and the magnified or reduced input signal is displayed in the second picture plane.

According to the invention, there is provided a display method of a television apparatus for displaying a first picture plane and a second picture plane onto a same picture plane, characterized by comprising the steps of: magnifying or reducing an input signal of a program on a different channel or an input signal other than a signal displayed at present on the first picture plane; and displaying the magnified or reduced input signal onto the second picture plane.

According to the invention, there is provided a picture plane control apparatus for displaying an inputted signal onto a picture plane, characterized by comprising: dividing means for discriminating a magnification or a reduction of the signal; a memory into/from which the signal can be written and read out; write control means for writing a desired area of the signal into the memory; and read control means for allowing the signal written in the memory to be displayed at a desired position.

According to the invention, there is provided a picture plane control method of displaying an inputted signal onto a picture plane, characterized by comprising the steps of: discriminating a magnification or a reduction of the signal by dividing means; writing a desired area of the signal into a memory; and allowing the signal written in the memory to be displayed at a desired position on the picture plane.

When the inputted image is written into a field memory, a writing range (HAct, VAct) can be varied. Thus, in a slave picture plane of PinP, by displaying only necessary information of an arbitrary portion of the image such as small characters, small person, or the like which cannot be discriminated, it can be discriminated. In the first and/or the second picture plane of P&P, the upper and lower black edge portions of a letter box signal are removed and the image can be displayed at an inherent aspect ratio.

BRIEF DESCRIPTION OF DRAWINGS

FIG. 8 is a block diagram of a conventional picture-in-picture;

BEST MODE FOR CARRYING OUT THE INVENTION

Figure 1:
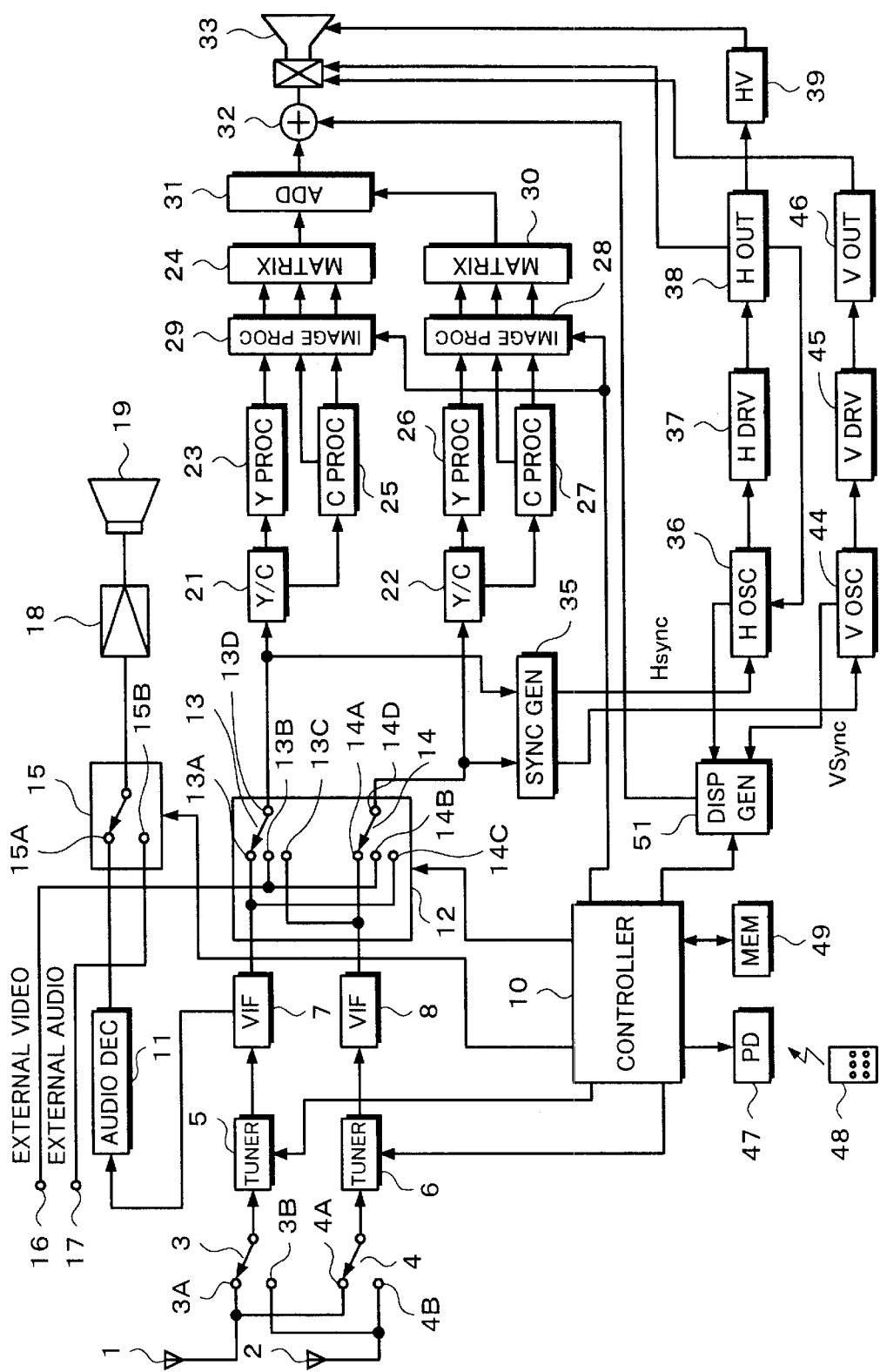
FIG. 1 is a block diagram showing an embodiment of a television receiver to which the invention is applied.

An embodiment of the invention will now be described hereinbelow with reference to the drawings. FIG. 1 shows an example of a television receiver to which the invention is applied. In the television receiver to which the invention is applied, PinP can be set.

In FIG. 1, reference numerals 1 and 2 denote antennas. Signals from a television broadcasting station are received by the antennas 1 and 2. The reception signal from the antenna 1 is supplied to a terminal 3A of an antenna switch 3 and to a terminal 4A of an antenna switch 4. The reception signal from the antenna 2 is supplied to an input terminal 3B of the antenna switch 3 and to an input terminal 4B of the antenna switch 4. An output of the antenna switch 3 is supplied to a tuner circuit 5. An output of the antenna switch 4 is supplied to a tuner circuit 6.

The antenna switch 3 switches a signal which is inputted to the tuner circuit 5 between the reception signal from the antenna 1 and the reception signal from the antenna 2. When the antenna switch 3 is set to the terminal 3A side, the reception signal from the antenna 1 is supplied to the tuner circuit 5 via the antenna switch 3. When the antenna switch 3 is set to the terminal 3B side, the reception signal from the antenna 2 is supplied to the tuner circuit 5 via the antenna switch 3.

The antenna switch 4 switches a signal which is inputted to the tuner circuit 6 between the reception signal from the antenna 1 and the reception signal from the antenna 2. When the antenna switch 4 is set to the terminal 4A side, the reception signal from the antenna 1 is supplied to the tuner circuit 6 via the antenna switch 4. When the antenna switch 4 is set to the terminal 4B side, the reception signal from the antenna 2 is supplied to the tuner circuit 6 via the antenna switch 4.

The tuner circuit 5 is a main tuner circuit for a master picture plane. A desired reception channel to be displayed on the master picture plane is selected by the tuner circuit 5. The reception signal is converted into an intermediate frequency signal and supplied to an intermediate frequency and video detecting circuit 7.

The tuner circuit 6 is a sub tuner circuit for a slave picture plane. A desired reception channel to be displayed on the slave picture plane is selected by the tuner circuit 6. The reception signal is converted into an intermediate frequency signal and supplied to an intermediate frequency and video detecting circuit 8.

A channel setting signal is supplied from a controller 10 to the tuner circuits 5 and 6. By the tuner setting signal, the channels of the tuner circuits 5 and 6 are set. Information regarding the channels has been stored in a memory 49.

As mentioned above, in the television receiver to which the invention is applied, the two tuner circuits of the main tuner circuit 5 and sub tuner circuit 6 are provided and the different channels can be set for the master picture plane and the slave picture plane by the tuner circuits 5 and 6.

The intermediate frequency signal from the main tuner circuit 5 for the master picture plane is amplified and a video signal is detected by the intermediate frequency and video detecting circuit 7. Thus, a composite color video signal of, for example, the NTSC system to form the master picture plane is demodulated. The composite color video signal is supplied to a terminal 13A of the switching circuit 13 of the video source change-over switch 12 and supplied to a terminal 14C of the switching circuit 14.

The intermediate frequency signal from the sub tuner circuit 6 for the slave picture plane is amplified and a video signal is detected by the intermediate frequency and video detecting circuit 8. Thus, a composite color video signal of, for example, the NTSC system to form the slave picture plane is demodulated. The composite color video signal is supplied to a terminal 14A of the switching circuit 14 of the video source change-over switch 12 and supplied to a terminal 13C of the switching circuit 13.

An audio intermediate frequency signal is extracted from a beat component of, for example, 4.5 MHz by the intermediate frequency and video detecting circuit 7. The audio intermediate frequency signal is supplied to an audio decoder 11. An audio signal is demodulated by the audio decoder 11. The audio signal from the audio decoder 11 is supplied to a terminal 15A of an audio source change-over switch 15.

The television receiver to which the invention is applied has an external video input terminal 16 and an external audio input terminal 17. A composite color video signal from the outside is supplied to the external video input terminal 16 and an audio signal from the outside is supplied to the external audio input terminal 17.

The video signal from the external video input terminal 16 is supplied to a terminal 13B of the switching circuit 13 of the video source change-over switch 12 and to a terminal 14B of the switching circuit 14. The audio signal from the external audio input terminal 17 is supplied to a terminal 15B of the audio source change-over switch 15.

The video source change-over switch 12 switches video sources on the basis of a switch control signal from the controller 10. The video source change-over switch 12 has the switching circuit 13 to select the video signal to be displayed on the master picture plane and the switching circuit 14 to select the video signal to be displayed on the slave picture plane.

The video signal to be displayed on the master picture plane is outputted from an output terminal 13D of the switching circuit 13 of the video source change-over switch 12. The video signal to be displayed on the slave picture plane is outputted from an output terminal 14D of the switching circuit 14.

The switching circuit 13 of the video source change-over switch 12 is switched to the terminal 13A side in the case where the picture plane based on the video signal of the channel set by the main tuner circuit 5 is displayed on the master picture plane, switched to the terminal 13B side in the case where the picture plane based on the video signal from the external video input terminal 16 is displayed on the master picture plane, and switched to the terminal 13C side in the case where the picture plane based on the video signal of the channel set by the sub tuner circuit 6 is displayed on the master picture plane.

The switching circuit 14 of the video source change-over switch 12 is switched to the terminal 14A side in the case where the picture plane based on the video signal of the channel set by the sub tuner circuit 6 is displayed on the slave picture plane, switched to the terminal 14B side in the case where the picture plane based on the video signal from the external video input terminal 16 is displayed on the slave picture plane, and switched to the terminal 14C side in the case where the picture plane based on the video signal of the channel set by the main tuner circuit 5 is displayed on the slave picture plane.

The audio source change-over switch 15 switches audio sources on the basis of a switch control signal from the controller 10. An output of the audio source change-over switch 15 is supplied to an audio amplifier 18. An output of the audio amplifier 18 is supplied to a speaker 19.

The audio source change-over switch 15 is switched to the terminal 15A side in case of outputting the audio sound based on the audio signal of the channel set by the main tuner circuit 5 and switched to the terminal 15B side in case of outputting the audio sound based on the audio signal from the external audio input terminal 17.

The video signal of the master picture plane which is outputted from the output terminal 13D of the switching circuit 13 of the video source change-over switch 12 is supplied to a Y/C separating circuit 21. The video signal of the slave picture plane which is outputted from the output terminal 14D of the switching circuit 14 is supplied to a Y/C separating circuit 22.

The Y/C separating circuit 21, a luminance signal processing circuit 23, a chroma signal processing circuit 25, an image processing circuit 29, and a matrix circuit 24 generate three primary color signals R, G, and B to be displayed on the master picture plane.

That is, the video signal of the master picture plane is separated into a luminance signal Y and a chroma signal C by the Y/C separating circuit 21. The luminance signal Y from the Y/C separating circuit 21 is supplied to the luminance signal processing circuit 23. In the luminance signal processing circuit 23, picture quality adjustments such as luminance adjustment, brightness adjustment, and the like are executed.

The chroma signal C from the Y/C separating circuit 21 is supplied to the chroma signal processing circuit 25. In the chroma signal processing circuit 25, a burst signal is extracted from the reception signal and color difference signals I and Q are demodulated by using the burst signal. In the chroma signal processing circuit 25, an ACC (Automatic Color Control), a frequency characteristics correction, and the like are performed.

The luminance signal Y from the luminance signal processing circuit 23 and the color difference signals I and Q from the chroma signal processing circuit 25 are supplied to the image processing circuit 29. The image processing circuit 29 is an essence of the invention. As will be explained hereinlater, in the image processing circuit 29, processes are performed to the luminance signal Y and color difference signals I and Q. In the image processing circuit 29, a signal of the master picture plane to be displayed on the master picture plane is formed. The signal of the master picture plane is supplied to the matrix circuit 24. By the matrix circuit 24, three primary color signals R, G, and B for the master picture plane are formed by the luminance signal Y and color difference signals I and Q.

The Y/C separating circuit 22, a luminance signal processing circuit 26, a chroma signal processing circuit 27, an image processing circuit 28, and a matrix circuit 30 are used to form the slave picture plane and are called a PinP circuit.

That is, the video signal of the slave picture plane is separated into a luminance signal Y and a chroma signal C by the Y/C separating circuit 22. The luminance signal from the Y/C separating circuit 22 is supplied to the luminance signal processing circuit 26. The chroma signal C is supplied to the chroma signal processing circuit 27. In the chroma signal processing circuit 27, a burst signal is extracted from the reception signal and the color difference signals I and Q are demodulated by using the burst signal.

The luminance signal Y from the luminance signal processing circuit 26 and the color difference signals I and Q from the chroma signal processing circuit 27 are supplied to the image processing circuit 28. In a manner similar to the foregoing image processing circuit 29, the image processing circuit 28 is an essence of the invention. As will be explained hereinlater, in the image processing circuit 28, processes are performed to the luminance signal Y and color difference signals I and Q. In the image processing circuit 28, a signal of the slave picture plane to be displayed on the slave picture plane is formed. The signal of the slave picture plane is supplied to the matrix circuit 30. By the matrix circuit 30, three primary color signals R, G, and B for the slave picture plane are formed by the luminance signal Y and color difference signals I and Q.

The three primary color signals R, G, and B of the master picture plane from the matrix circuit 24 and the three primary color signals R, G, and B of the slave picture plane from the matrix circuit 30 are supplied to a synthesizing circuit 31. In the synthesizing circuit 31, the three primary color signals R, G, and B of the master picture plane and the three primary color signals R, G, and B of the slave picture plane are synthesized.

An output of the synthesizing circuit 31 is supplied to an adding circuit 32 of a display signal. A display signal is supplied from a display generating circuit 51 to the adding circuit 32. An output of the adding circuit 32 is supplied to an image receiving tube 33.

The video signal of the master picture plane is supplied to a sync generating circuit 35 via the output terminal 13D of the switching circuit 13. The video signal of the slave picture plane is supplied to the sync generating circuit 35 via the output terminal 14D of the switching circuit 14. Horizontal and vertical sync signals are extracted by the sync generating circuit 35. The horizontal sync signal extracted by the sync generating circuit 35 is supplied to a horizontal oscillating circuit 36. The vertical sync signal extracted by the sync generating circuit 35 is supplied to a vertical oscillating circuit 44.

A horizontal pulse synchronized with the horizontal sync signal from the sync generating circuit 35 is formed by the horizontal oscillating circuit 36. The horizontal pulse is supplied to a horizontal output circuit 38 via a horizontal driving circuit 37. A horizontal saw-tooth wave current is supplied to a horizontal deflecting coil of the image receiving tube 33 by the horizontal output circuit 38.

At this time, a flyback pulse is generated for a blanking period of the saw-tooth wave. The flyback pulse is fed back to the horizontal oscillating circuit 36. The feedback pulse and an output of the horizontal oscillating circuit 36 are phase compared. On the basis of a comparison output, an oscillating frequency is controlled. Thus, an AFC (Automatic Frequency Control) loop is constructed and the oscillating operation of the horizontal oscillating circuit 36 is stably held.

The flyback pulse is stepped up and a high voltage is formed by a high voltage circuit 39. The high voltage is applied as an anode voltage or a focusing voltage to the image receiving tube 33.

The vertical oscillating circuit 44 generates a saw-tooth wave synchronized with the vertical sync signal from the sync generating circuit 35. An output of the vertical oscillating circuit 44 is supplied to a vertical output circuit 46 via a vertical driving circuit 45. A vertical saw-tooth wave current is supplied to a vertical deflecting coil of the image receiving tube 33 by the vertical output circuit 46.

The controller 10 controls the whole operation. An input is supplied from a remote commander 48 to the controller 10 via a photosensing circuit 47. A reception channel or the like is set on the basis of the input. The display signal is generated from the display generating circuit 51 on the basis of an output of the controller 10.

A horizontal pulse and a vertical pulse which are synchronized with the horizontal sync signal and the vertical sync signal are supplied from the horizontal oscillating circuit 36 and vertical oscillating circuit 44 to the display generating circuit 51. The flyback pulse from the horizontal output circuit can be used as it is as a horizontal pulse. The display signal is generated by a display generating circuit 40 at the timing based on the horizontal and vertical pulses. The display signal is supplied to the adding circuit 32.

In the adding circuit 32, the display signal from the display generating circuit 51 is multiplexed to the three primary color signals R, G, and B from the synthesizing circuit 31. Thus, a setting state of a channel and a sound volume is displayed on the screen of the image receiving tube 33.

Figure 2:
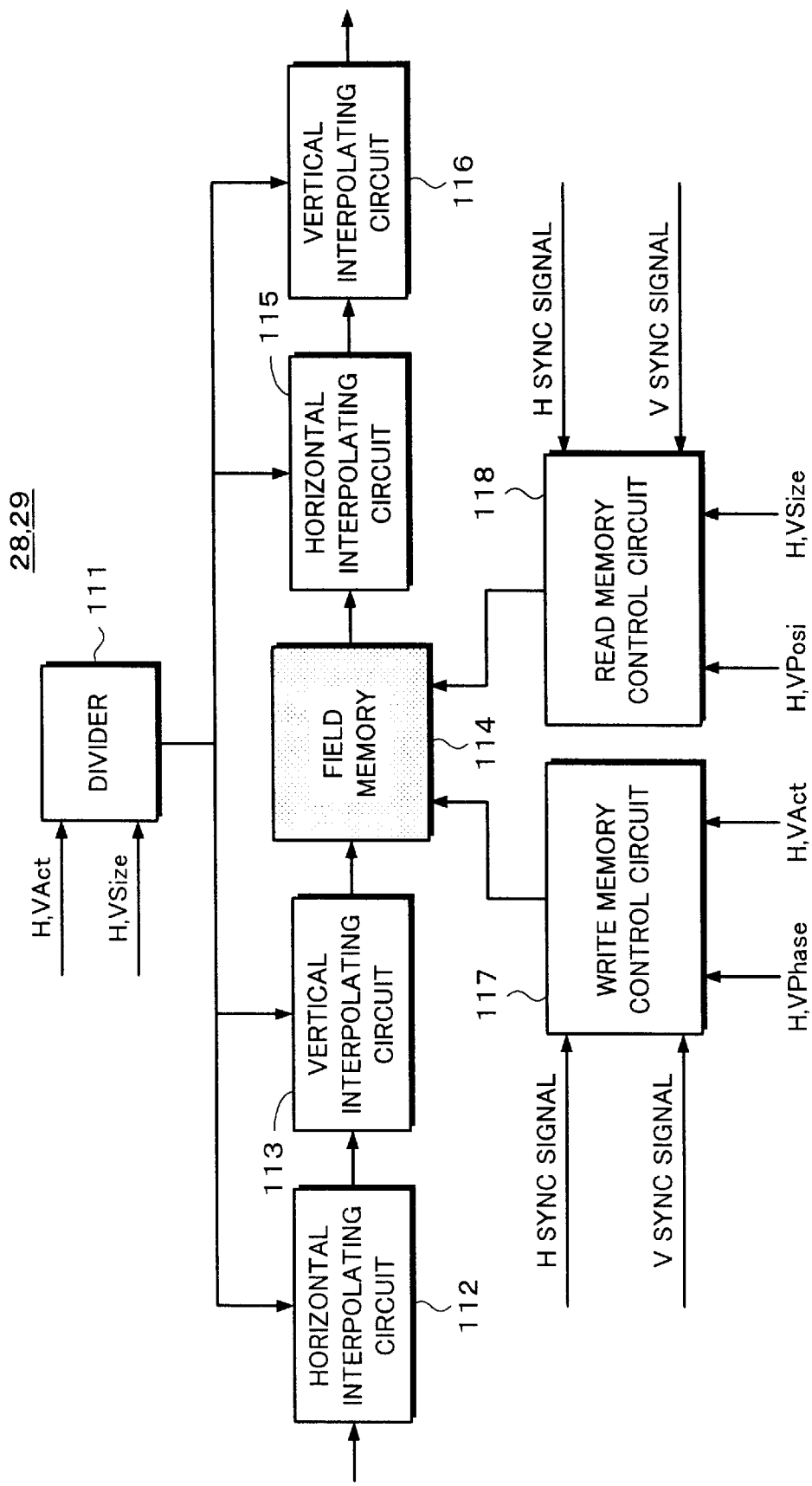
FIG. 2 is a block diagram of an embodiment of the invention.

FIG. 2 shows a block diagram of the embodiment of the image processing circuits 29 and 28 as an essence of the invention. According to the embodiment, extraction and scaling of an arbitrary portion of an input image which is supplied are performed by a field memory. Parameters of a writing range (HAct, VAct) and a reading range (HSize, VSize) are supplied to a divider 111. A ratio of magnification or reduction of the image is set into the divider 111 by the writing range (HAct, VAct) and reading range (HSize, VSize) as will be explained hereinafter. The set ratio is supplied to horizontal interpolating circuits 112 and 115 and vertical interpolating circuits 113 and 116.

In the horizontal interpolating circuit 112, when the ratio of the reduction is supplied from the divider 111 for the inputted image, an interpolation in the horizontal direction is performed on the basis of the ratio. The image subjected to the interpolation in the horizontal direction is supplied to the vertical interpolating circuit 113. In the vertical interpolating circuit 113, when the ratio of the reduction is supplied from the divider 111 for the image from the horizontal interpolating circuit 112, an interpolation in the vertical direction is performed on the basis of the ratio. The image subjected to the interpolation in the vertical direction is supplied to a field memory 114.

The image supplied from the vertical interpolating circuit 113 on the basis of a control signal that is supplied from a write memory control circuit 117 is written into the field memory 114. The horizontal sync signal, the vertical sync signal, and the parameters of the write start position (HPhase, VPhase) and writing range (HAct, VAct) are supplied to the write memory control circuit 117. The parameters have a relation shown in FIG. 3. The image surrounded by the writing range (HAct, VAct) is written into the field memory 114.

The image written in the field memory 114 is read out therefrom on the basis of a control signal which is supplied from a read memory control circuit 118. The horizontal sync signal, the vertical sync signal, and the parameters of the read start position (HPosition, VPosition) and reading range (HSize, VSize) are supplied to the read memory control circuit 118. The parameters have a relation shown in FIG. 4. The image written in the field memory 114 is read out so as to be displayed in a range surrounded by the reading range (HSize, VSize). The read-out image is supplied to the horizontal interpolating circuit 115.

In the horizontal interpolating circuit 115, when the magnification ratio is supplied from the divider 111 for the image from the field memory 114, an interpolation in the horizontal direction is performed on the basis of the ratio. The image subjected to the interpolation in the horizontal direction is supplied to the vertical interpolating circuit 116. In the vertical interpolating circuit 116, when the magnification ratio is supplied from the divider 111 for the image from the horizontal interpolating circuit 115, an interpolation in the vertical direction is performed on the basis of the ratio. The image subjected to the interpolation in the vertical direction is outputted.

Figure 5:
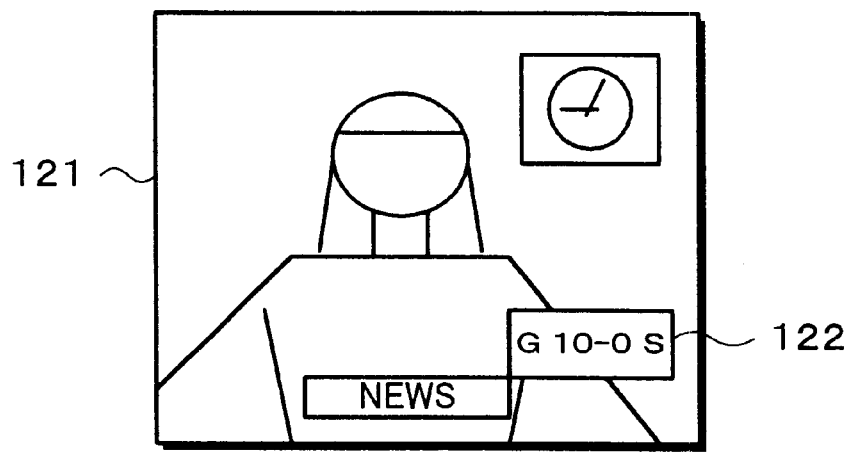
FIG. 5 shows an example of a picture plane of a picture-in-picture to which the invention is applied.

The outputted image is multiplexed as a slave picture plane 122 of PinP into a master picture plane 121 as shown in FIG. 5. In an example of FIG. 5, a TV news program is displayed on the master picture plane 121 and a score display portion of a baseball relay of a program on a different channel is extracted and displayed on the slave picture plane 122, so that the progress of the score can be successively confirmed.

Figure 6:
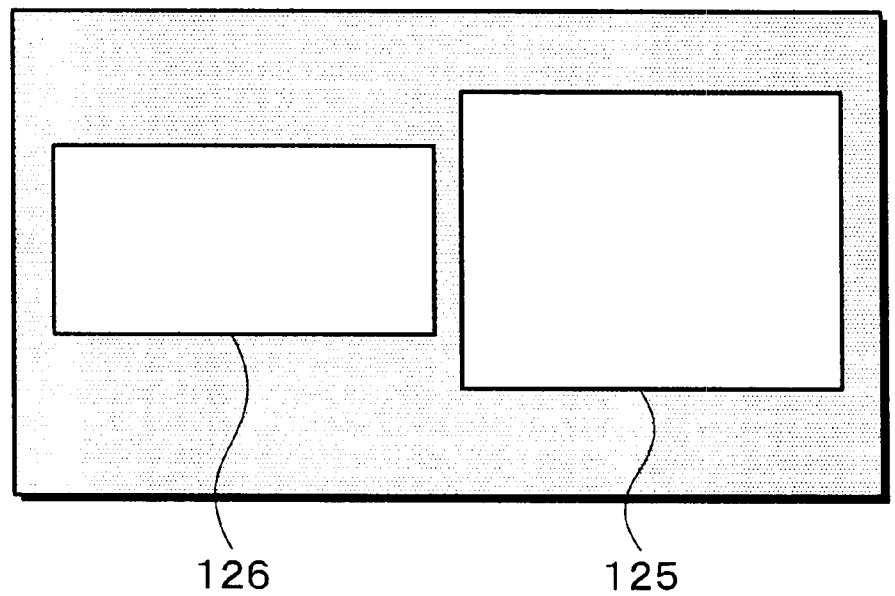
FIG. 6 shows an example of a picture plane of a picture-and-picture to which the invention is applied.

In the case where an image to be displayed is a letter box signal in P&P, the letter box signal is detected. As shown in FIG. 6, a picture plane 126 in which unnecessary portions of the letter box signal, namely, upper and lower black edge portions are removed is displayed at a position adjacent to a picture plane 125.

Figure 3:
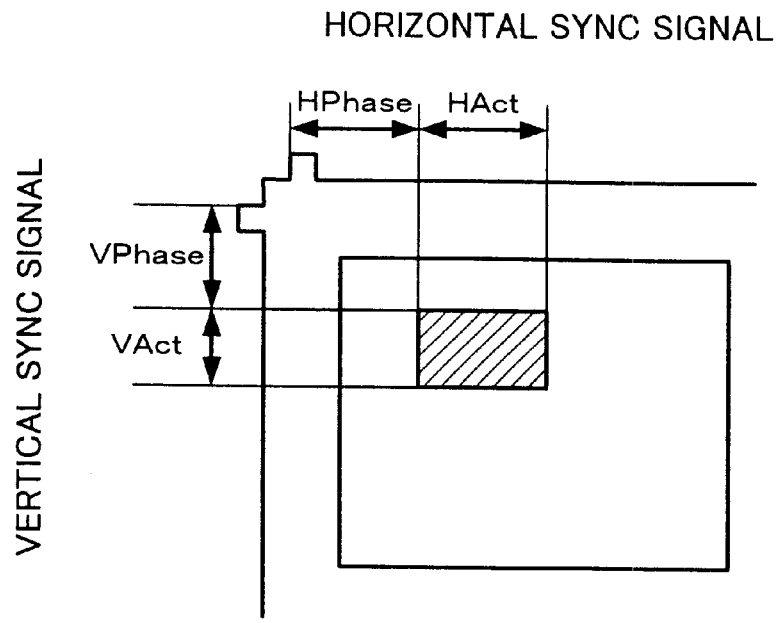
FIG. 3 is a schematic diagram for use in explanation upon writing that is applied to the invention.
Figure 4:
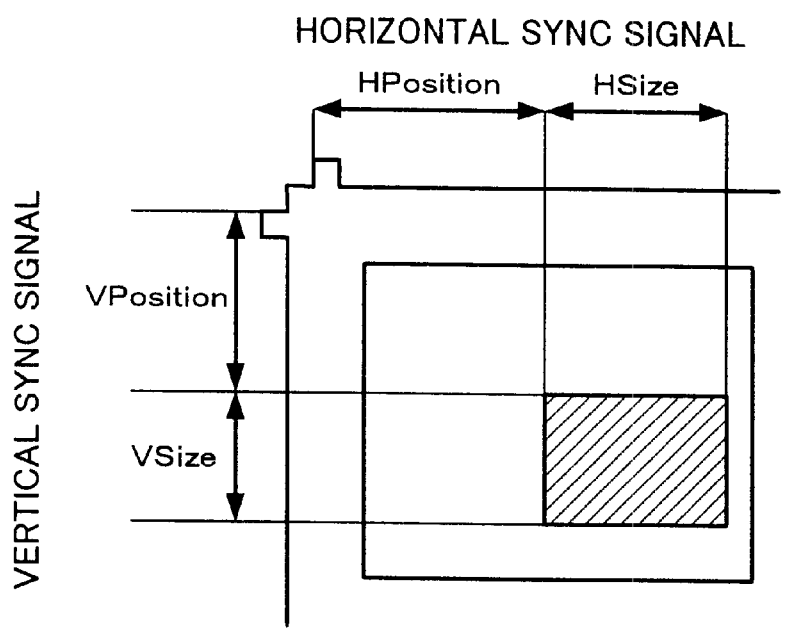
FIG. 4 is a schematic diagram for use in explanation upon reading that is applied to the invention.

As shown in FIG. 3, in response to the horizontal sync signal and the vertical sync signal upon writing, the write start position (HPhase, VPhase) and the writing range (HAct, VAct) in each of the horizontal and vertical directions are determined and the writing to the field memory 114 is controlled, thereby allowing only an arbitrary portion of the input image to be written into the field memory 114. As shown in FIG. 4, even at the time of the reading, in response to the horizontal sync signal and the vertical sync signal upon reading, the read start position (HPosition, VPosition) and the reading range (HSize, VSize) in each of the horizontal and vertical directions are determined and the reading from the field memory 114 is controlled, thereby enabling an arbitrary portion of the input image extracted and written in the field memory 114 upon writing to be displayed with an arbitrary size at an arbitrary position.

Now, assuming that the magnification or reduction ratio set in the divider 111 is equal to $HSize/HAct \geq 1$ and $VSize/VAct \geq 1$, a magnifying process is performed. When reading from the field memory 114, the reading operation is performed twice on a pixel unit basis or on a line unit basis. After that, the interpolating processes are executed by the horizontal interpolating circuit 115 and vertical interpolating circuit 116 in order to improve the picture quality. By those processes, the magnifying process of the arbitrary portion of the input image can be performed.

Now, assuming that the magnification or reduction ratio set in the divider 111 is equal to $HSize/HAct < 1$ and $VSize/VAct < 1$, a reducing process is performed. Before writing into the field memory 114, the interpolating processes are performed to the image by the horizontal interpolating circuit 112 and vertical interpolating circuit 113. When writing into the field memory 114, the decimation is performed on a pixel unit basis or on a line unit basis. In case of the reducing process, as mentioned above, the signal is decimated on a pixel unit basis or on a line unit basis and written into the field memory 14. Therefore, the interpolating processes are executed in the horizontal and vertical directions in the horizontal interpolating circuit 112 and vertical interpolating circuit 113 so that the signal can be easily decimated, and an arbitrary reduction is performed. Upon reading, the image is continuously read out in accordance with the read start position (HPosition, VPosition) and the reading range (HSize, VSize) supplied to the read memory control circuit 118. By those processes, a reducing process of an arbitrary portion of the input image can be performed.

Figure 7A:
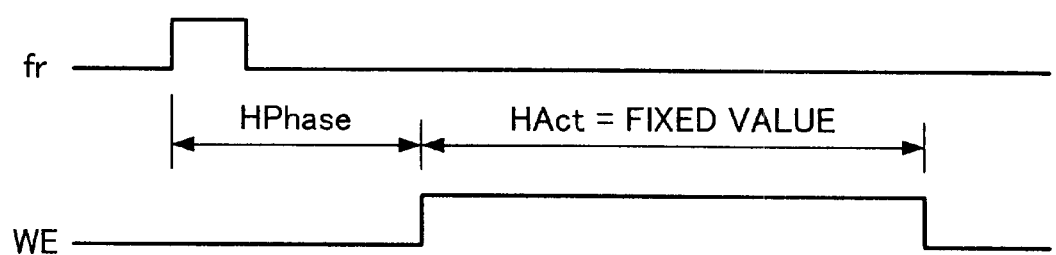
FIGS. 7A and 7B are schematic diagrams for explaining a writing range which is applied to the invention.
Figure 7B:
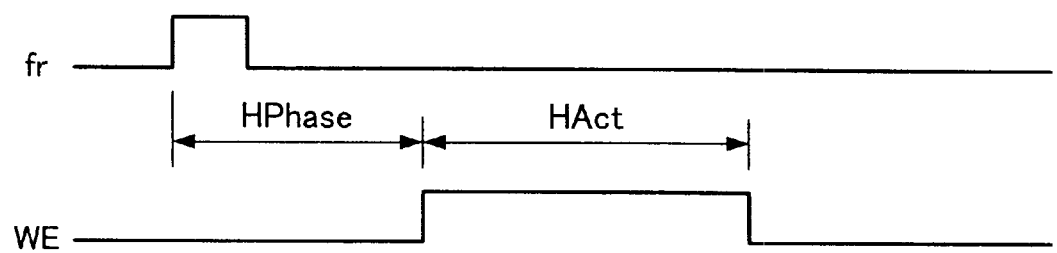
Figure 9:
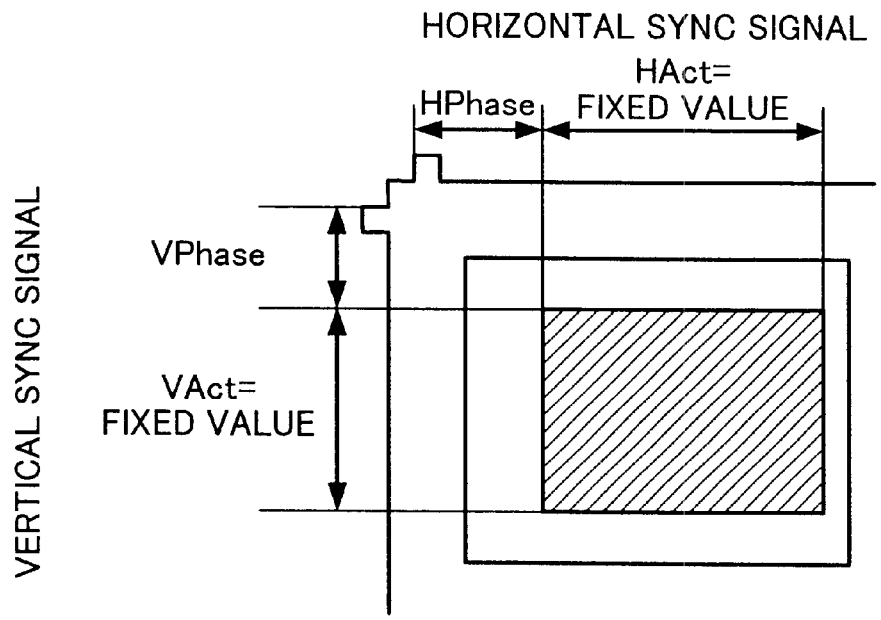
FIG. 9 is a schematic diagram for use in explanation upon writing.
Figure 10:
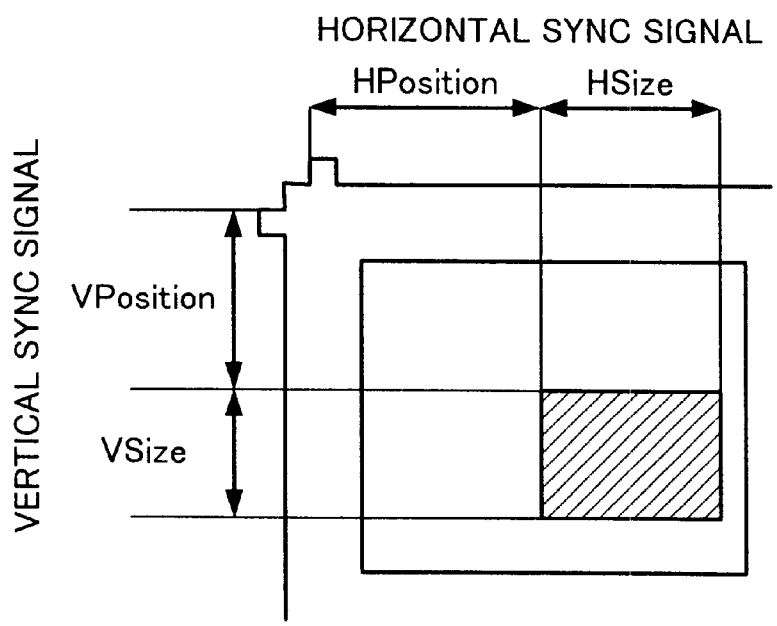
FIG. 10 is a schematic diagram for use in explanation upon reading.
Figure 11:
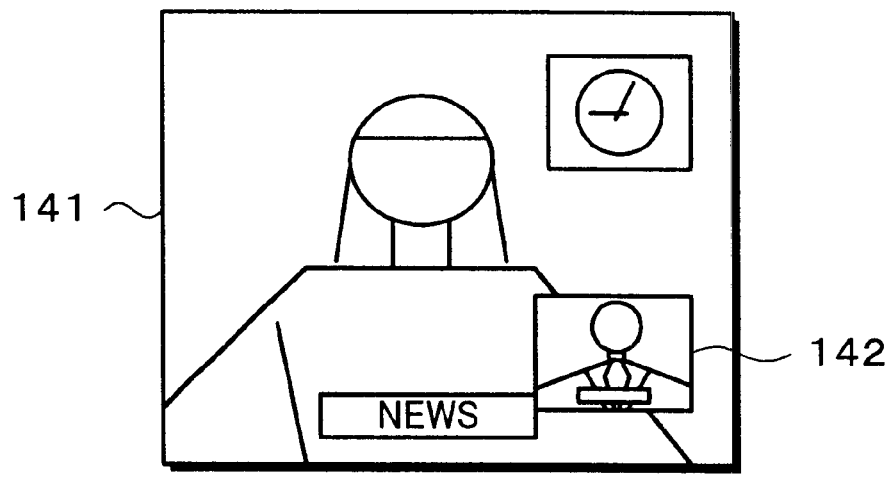
FIG. 11 is a schematic diagram of a picture plane of the conventional picture-in-picture.
Figure 12:
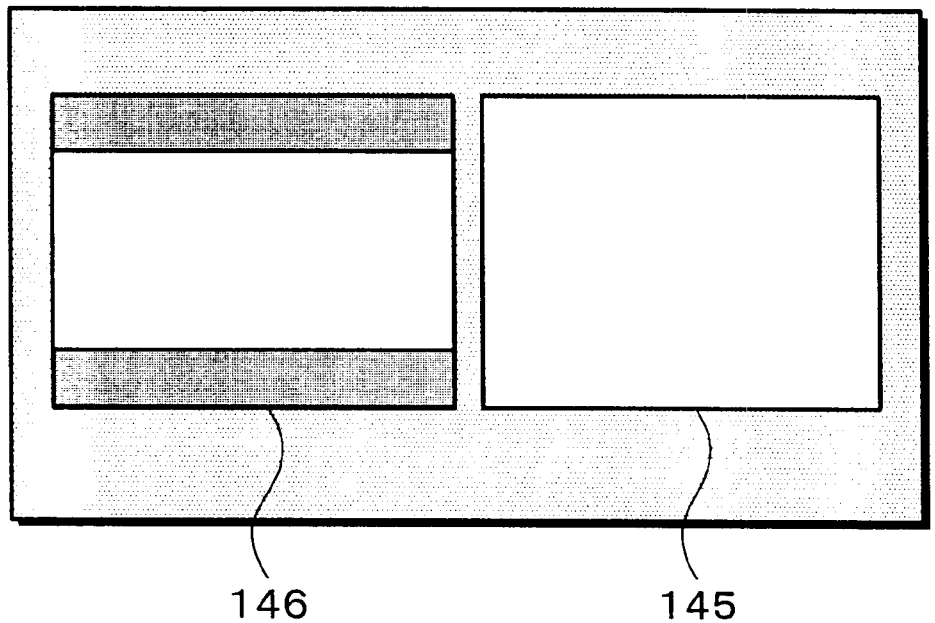
FIG. 12 is a schematic diagram of a picture plane of a conventional picture-and-picture.

For example, as shown in FIG. 7A, hitherto, after the write start position HPhase, a period of time during which the writing is permitted, namely, the writing range HAct is fixed. However, as shown in FIG. 7B, after the write start position HPhase, the writing range HAct can be varied. Although the writing range HAct has been described in FIGS. 7A and 7B, the writing range VAct can be also similarly varied.

By newly providing the parameters (HAct, VAct) to decide the range on the writing side as mentioned above, an arbitrary portion of a program on a different channel can be written into the field memory 114. The magnification or reduction ratio of the extracted portion is set by the parameters of the writing range (HAct, VAct) and reading range (HSize, VSize).

In the embodiment, although the image displayed on the slave picture plane of PinP or the image displayed on the second picture plane of P&P is the arbitrary portion of the image of the program on a different channel, an arbitrary portion of an image other than the input signal displayed on the master picture plane or the first picture plane, for example, the image from the video input can be used.

According to the invention, small characters or a small person is magnified and displayed on the slave picture plane of PinP. That is, by extracting only the necessary information of the arbitrary portion of the image and displaying on the slave picture plane, the small characters or small person can be discriminated. For example, by extracting only the portion of the score display of the baseball relay of the program on a different channel and displaying on the slave picture plane of PinP, the progress of the score of the baseball relay can be successively confirmed while watching a TV drama.

Further, according to the invention, by removing the upper and lower black edge portions even for the letter box signal, a P&P display can be performed at the inherent aspect ratio.

Industrial Applicability

As mentioned above, in the television apparatus, the display method of the television apparatus, and the picture plane control apparatus and method according to the invention, only the necessary area can be extracted from the video signal serving as a slave picture plane of PinP or the first and/or the second picture plane of P&P and they are useful in case of further performing the reduction or magnification to such a signal and displaying it onto the picture plane.

What is claimed is:

1. A television apparatus for displaying a first picture plane and a second picture plane onto a same picture plane, characterized in that
   said television apparatus has a signal processing means for magnifying or reducing an input signal of a program on a different channel or an input signal other than a signal displayed at present on said first picture plane by interpolation,
   said magnified or reduced input signal is displayed in said second picture plane, and
   said signal processing means comprises:
      first interpolating means for performing an interpolation when a reduced image is displayed;
      a memory in which the image from said first interpolating means is written;
      control means for designating a portion of the image to be written into said memory on the basis of a write start position and a writing range and reading out the portion of the image written in said memory on the basis of a read start position and a reading range; and
      second interpolating means for performing an interpolation of the portion of said image read out from said memory when a magnified image is displayed.

2. A television apparatus for displaying a first picture plane and a second picture plane onto a same picture plane, characterized in that
   said television apparatus has a signal processing means for magnifying or reducing an input signal of a program on a different channel or an input signal other than a signal displayed at present on said first picture plane by interpolation,
   said magnified or reduced input signal is displayed in said second picture plane,
   said second picture plane is displayed in said first picture plane, and
   said signal processing means comprises:
      first interpolating means for performing an interpolation when a reduced image is displayed;
      a memory in which the image from said first interpolating means is written;
      control means for designating a portion of the image to be written into said memory on the basis of a write start position and a writing range and reading out the portion of the image written in said memory on the basis of a read start position and a reading range; and
      second interpolating means for performing an interpolation of the portion of said image read out from said memory when a magnified image is displayed.

3. A television apparatus for displaying a first picture plane and a second picture plane onto a same picture plane, characterized in that
   said television apparatus has a signal processing means for magnifying or reducing an input signal of a program on a different channel or an input signal other than a signal displayed at present on said first picture plane by interpolation, said magnified or reduced input signal is displayed in said second picture plane, said second picture plane is displayed at a position adjacent to said first picture plane, and said signal processing means comprises:
first interpolating means for performing an interpolation when a reduced image is displayed;
a memory in which the image from said first interpolating means is written;
control means for designating a portion of the image to be written into said memory on the basis of a write start position and a writing range and reading out the portion of the image written in said memory on the basis of a read start position and a reading range; and
second interpolating means for performing an interpolation of the portion of said image read out from said memory when a magnified image is displayed.

4. A television apparatus for displaying a first picture plane and a second picture plane onto a same picture plane, characterized in that said television apparatus has a signal processing means for magnifying or reducing an input signal of a program on a different channel or an input signal other than a signal displayed at present on said first picture plane by interpolation, said magnified or reduced input signal is displayed in said second picture plane, said signal processing means comprises:
first interpolating means for performing an interpolation when a reduced image is displayed;
a memory in which the image from said first interpolating means is written;
control means for designating a portion of the image to be written into said memory on the basis of a write start position and a writing range and reading out the portion of the image written in said memory on the basis of a read start position and a reading range; and
second interpolating means for performing an interpolation of the portion of said image read out from said memory when a magnified image is displayed, wherein a letter box signal is detected and an image obtained by removing upper and lower black edges of said detected letter box signal is di splayed in said first and/or said picture plane.

5. A display method of a television apparatus for displaying a first picture plane and a second picture plane onto a same picture plane, characterized by comprising the steps of:

magnifying or reducing an input signal of a program on a different channel or an input signal other than a signal displayed at present on said first picture plane by interpolation; and displaying said magnified or reduced input signal onto said second picture plane, said magnification or said reduction is discriminated from a writing range and a reading range and when said reduction is determined, an interpolation in a horizontal direction and a vertical direction is performed to said input signal prior to writing into a memory said interpolated input signal is decimated on a pixel unit basis or on a line unit basis, a signal according to write start position or said writing range is written into said memory, and a read start position and said signal written in said memory are read out in accordance with said reading range and displayed on said second picture plane.

6. A display method of a television apparatus for displaying a first picture plane and a second picture plane onto a same picture plane, characterized by comprising the steps of:

magnifying or reducing an input signal of a program on a different channel or an input signal other than a signal displayed at present on said first picture plane by interpolation; and displaying said magnified or reduced input signal onto said second picture plane, said magnification or said reduction is discriminated from a writing range and a reading range, wherein when said reduction is determined, an interpolation in a horizontal direction and a vertical direction is performed to said input signal prior to writing into a memory said interpolated input signal is decimated on a pixel unit basis or on a line unit basis, a signal according to write start position or said writing range is written into said memory, and a read start position and said signal written in said memory are read out in accordance with said reading range and displayed on said second picture plane, and wherein when said magnification is determined, the signal written in a memory is read out in accordance with a read start position and said reading range, and an interpolation in a horizontal direction and a vertical direction is performed to said read-out signal and displayed on said second picture plane.

7. A display method of a television apparatus for displaying a first picture plane and a second picture plane onto a same picture plane, characterized by comprising the steps of:

magnifying or reducing an input signal of a program on a different channel or an input signal other than a signal displayed at present on said first picture plane by interpolation; and displaying said magnified or reduced input signal onto said second picture plane, said picture plane is displayed in said first picture plane, and said magnification or said reduction is discriminated from a writing range and a reading range and when said reduction is determined, an interpolation in a horizontal direction and a vertical direction is performed to said input signal prior to writing into a memory said interpolated input signal is decimated on a pixel unit basis or on a line unit basis, a signal according to write start position or said writing range is written into said memory, and a read start position and said signal written in said memory are read out in accordance with said reading range and displayed on said second picture plane.

8. A display method of a television apparatus for displaying a first picture plane and a second picture plane onto a same picture plane, characterized by comprising the steps of:

magnifying or reducing an input signal of a program on a different channel or an input signal other than a signal displayed at present on said first picture plane by interpolation; and displaying said magnified or reduced input signal onto said second picture plane, said picture plane is displayed at a position adjacent to said first picture plane, and said magnification or said reduction is discriminated from a writing range and a reading range and when said reduction is determined, an interpolation in a horizontal direction and a vertical direction is performed to said input signal prior to writing into a memory said interpolated input signal is decimated on a pixel unit basis or on a line unit basis, a signal according to write start position or said writing range is written into said memory, and a read start position and said signal written in said memory are read out in accordance with said reading range and displayed on said second picture plane.

9. A display method of a television apparatus for displaying a first picture plane and a second picture plane onto a same picture plane, characterized by comprising the steps of:

magnifying or reducing an input signal of a program on a different channel or an input signal other than a signal displayed at present on said first picture plane by interpolation;

displaying said magnified or reduced input signal onto said second picture plane; and detecting a letter box signal and an image is obtained by removing an upper and lower black edges of said detected letter box signal is displayed in said first and/or second picture plane, said magnification or said reduction is discriminated from a writing range and a reading range and when said reduction is determined, an interpolation in a horizontal direction and a vertical direction is performed to said input signal prior to writing into a memory said interpolated input signal is decimated on a pixel unit basis or on a line unit basis, a signal according to write start position or said writing range is written into said memory, and a read start position and said signal written in said memory are read out in accordance with said reading range and displayed on said second picture plane.

10. A picture plane control apparatus for allowing an input signal to be displayed on a picture plane, characterized by comprising:

dividing means for discriminating a magnification or a reduction of the input signal, wherein said input signal is magnified or reduced by an interpolation means;

a memory into/from which said input signal can be written and read out;

write control means for allowing a desired area of said input signal to be written into said memory; and read control means for allowing said input signal written in said memory to be displayed at a desired position of the picture plane, wherein when said reduction is determined from a writing range and a reading range by said dividing means, said write control means performs an interpolation in a horizontal direction and a vertical direction to said signal, decimates said interpolated signal on a pixel unit basis or on a line unit basis, and allows a signal according to a write start position and a writing range to be written into said memory.

11. A picture plane control apparatus for allowing an input signal to be displayed on a picture plane, characterized by comprising:

dividing means for discriminating a magnification or a reduction of the input signal, wherein said input signal is magnified or reduced by an interpolation means;

a memory into/from which said input signal can be written and read out;

write control means for allowing a desired area of said input signal to be written into said memory; and read control means for allowing said input signal written in said memory to be displayed at a desired position of the picture plane, wherein when said magnification is determined from a writing range by said dividing means, said read control means reads out said signal written in said memory in accordance with a read start position and a reading range, and performs an interpolation in a horizontal direction and a vertical direction to said read-out signal.

12. A picture plane control apparatus for allowing an input signal to be displayed on a picture plane, characterized by comprising:

dividing means for discriminating a magnification or a reduction of the input signal, wherein said input signal is magnified or reduced by an interpolation means;

a memory into/from which said input signal can be written and read out;

write control means for allowing a desired area of said input signal to be written into said memory; and read control means for allowing said input signal written in said memory to be displayed at a desired position of the picture plane, wherein said signal read out from said memory is displayed as a second picture plane at a desired position of a first picture plane, and wherein when said reduction is determined from a writing range and a reading range by said dividing means, said write control means performs an interpolation in a horizontal direction and a vertical direction to said signal, decimates said interpolated signal on a pixel unit basis or on a line unit basis, and allows a signal according to a write start position and a writing range to be written into said memory.

13. A picture plane control apparatus for allowing an input signal to be displayed on a picture plane, characterized by comprising:

dividing means for discriminating a magnification or a reduction of the input signal, wherein said input signal is magnified or reduced by an interpolation means;

a memory into/from which said input signal can be written and read out;

write control means for allowing a desired area of said input signal to be written into said memory; and read control means for allowing said input signal written in said memory to be displayed at a desired position of the picture plane, wherein said signal read out from said memory is displayed as a second picture plane at a desired position adjacent to a first picture plane, and wherein when said reduction is determined from a writing range and a reading range by said dividing means, said write control means performs an interpolation in a horizontal direction and a vertical direction to said signal, decimates said interpolated signal on a pixel unit basis or on a line unit basis, and allows a signal according to a write start position and a writing range to be written into said memory.

14. A picture plane control apparatus for allowing an input signal to be displayed on a picture plane, characterized by comprising:

dividing means for discriminating a magnification or a reduction of the input signal, wherein said input signal is magnified or reduced by an interpolation means;

a memory into/from which said input signal can be written and read out;

write control means for allowing a desired area of said input signal to be written into said memory;

read control means for allowing said input signal written in said memory to be displayed at a desired position of the picture plane; and a letter box signal is detected and an image obtained by removing upper and lower black edges of said detected letter box signal is displayed in a first and/or a second picture plane, wherein when said reduction is determined from a writing range and a reading range by said dividing means, said write control means performs an interpolation in a horizontal direction and a vertical direction to said signal, decimates said interpolated signal on a pixel unit basis or on a line unit basis, and allows a signal according to a write start position and a writing range to be written into said memory.

15. A picture plane control method of displaying an input signal onto a picture plane, characterized by comprising the steps of:

discriminating a magnification or a reduction of the input signal by dividing means, wherein the input signal is magnified or reduced by an interpolation means;

writing a desired area of said input signal into a memory; and allowing said input signal written in said memory to be displayed at a desired position of the picture plane, wherein when said reduction is determined from a writing range and a reading range by said dividing means, an interpolation in a horizontal direction and a vertical direction is performed to said signal, said interpolated signal is decimated on a pixel unit basis or on a line unit basis, and the signal is written into said memory in accordance with a write start position and said writing range.

16. A picture plane control method of displaying an input signal onto a picture plane, characterized by comprising the steps of:

discriminating a magnification or a reduction of the input signal by dividing means, wherein the input signal is magnified or reduced by an interpolation means;

writing a desired area of said input signal into a memory; and allowing said input signal written in said memory to be displayed at a desired position of the picture plane, wherein when said magnification is determined from a writing range and a reading range by said dividing means, said signal written in said memory is read out in accordance with a read start position and said reading range, and an interpolation in a horizontal direction and a vertical direction is performed to said read-out signal.

17. A picture plane control method of displaying an input signal onto a picture plane, characterized by comprising the steps of:

discriminating a magnification or a reduction of the input signal by dividing means, wherein the input signal is magnified or reduced by an interpolation means;

writing a desired area of said input signal into a memory; and allowing said input signal written in said memory to be displayed at a desired position of the picture plane, wherein when said magnification is determined from a writing range and a reading range by said dividing means, said signal written in said memory is read out in accordance with a read start position and said reading range, and an interpolation in a horizontal direction and a vertical direction is performed to said read-out signal, wherein said signal read out from said memory is displayed as a second picture plane at a desired position of a first picture plane.

18. A picture plane control method of displaying an input signal onto a picture plane, characterized by comprising the steps of:

discriminating a magnification or a reduction of the input signal by dividing means, wherein the input signal is magnified or reduced by an interpolation means;

writing a desired area of said input signal into a memory; and allowing said input signal written in said memory to be displayed at a desired position of the picture plane, wherein when said magnification is determined from a writing range and a reading range by said dividing means, said signal written in said memory is read out in accordance with a read start position and said reading range, and an interpolation in a horizontal direction and a vertical direction is performed to said read-out signal, wherein said signal read out from said memory is displayed as a second picture plane at a desired position adjacent to a first picture plane.

19. A picture plane control method of displaying an input signal onto a picture plane, characterized by comprising the steps of:

discriminating a magnification or a reduction of the input signal by dividing means, wherein the input signal is magnified or reduced by an interpolation means;

writing a desired area of said input signal into a memory; and allowing said input signal written in said memory to be displayed at a desired position of the picture plane, wherein when said magnification is determined from a writing range and a reading range by said dividing means, said signal written in said memory is read out in accordance with a read start position and said reading range, and an interpolation in a horizontal direction and a vertical direction is performed to said read-out signal,14 wherein a letter box signal is detected and an image obtained by removing upper and lower black edges of said detected letter box signal is displayed in a first and/or a second picture plane.

* * * * *